(12) United States Patent
Shi et al.

(10) Patent No.: US 9,525,845 B2
(45) Date of Patent: Dec. 20, 2016

(54) NEAR-END INDICATION THAT THE END OF SPEECH IS RECEIVED BY THE FAR END IN AN AUDIO OR VIDEO CONFERENCE

(71) Applicants: DOLBY LABORATORIES LICENSING CORPORATION, San Francisco, CA (US); DOLBY INTERNATIONAL AB, Amsterdam Zuidoost (NL)

(72) Inventors: Dong Shi, Shanghai (CN); Xuejing Sun, Beijing (CN); Kai Li, Beijing (CN); Shen Huang, Beijing (CN); Harald Mundt, Fürth (DE); Heiko Purnhagen, Sundbyberg (SE); Glenn Dickins, Como (AU)

(73) Assignees: Dobly Laboratories Licensing Corporation, San Francisco, CA (US); Dobly International AB, Amsterdam Zuidoost (NL)

( * ) Notice: Subject to any disclaimer, the term of this patent is extended or adjusted under 35 U.S.C. 154(b) by 0 days.

(21) Appl. No.: 14/426,134

(22) PCT Filed: Sep. 27, 2013

(86) PCT No.: PCT/US2013/062159
§ 371 (c)(1),
(2) Date: Mar. 4, 2015

(87) PCT Pub. No.: WO2014/052745
PCT Pub. Date: Apr. 3, 2014

(65) Prior Publication Data
US 2015/0237301 A1    Aug. 20, 2015

Related U.S. Application Data

(60) Provisional application No. 61/706,267, filed on Sep. 27, 2012.

(30) Foreign Application Priority Data

Sep. 16, 2013    (CN) .......................... 2013 1 0422060

(51) Int. Cl.
*H04N 7/14*    (2006.01)
*H04N 7/15*    (2006.01)

(52) U.S. Cl.
CPC ................ *H04N 7/147* (2013.01); *H04N 7/15* (2013.01)

(58) Field of Classification Search
USPC ............ 348/14.01, 14.08, 14.09, 211.9, 295, 518,348/620, 669, 670
See application file for complete search history.

(56) References Cited

U.S. PATENT DOCUMENTS 5,533,110 A    7/1996  Pinard
5,539,741 A    7/1996  Barraclough
(Continued)

FOREIGN PATENT DOCUMENTS

CN    101686372    3/2010
EP    1962481    12/2009
(Continued)

OTHER PUBLICATIONS

Brooks, Jason, "Striving to Make a Marl" Jul. 1, 2002, eWeek.
(Continued)

*Primary Examiner* — Yosef L Laekemariam (57) ABSTRACT

Embodiments of client device and method for audio or video conferencing are described. An embodiment includes an offset detecting unit, a configuring unit, an estimator and an output unit. The offset detecting unit detects an offset of speech input to the client device. The configuring unit determines a voice latency from the client device to every far end. The estimator estimates a time when a user at the far end perceives the offset based on the voice latency. The (Continued)

output unit outputs a perceivable signal indicating that a user at the far end perceives the offset based on the time estimated for the far end. The perceivable signal is helpful to avoid collision between parties.

18 Claims, 7 Drawing Sheets

(56) References Cited

U.S. PATENT DOCUMENTS

| | | | |
|---|---|---|---|
| 5,809,472 A * | 9/1998 | Morrison | H04H 20/88 704/200.1 |
| 5,825,755 A * | 10/1998 | Thompson | H04L 12/413 370/296 |
| 6,119,147 A | 9/2000 | Toomey | |
| 6,343,313 B1 | 1/2002 | Salesky | |
| 6,418,125 B1 | 7/2002 | Oran | |
| D474,169 S | 5/2003 | Fletcher | |
| 6,559,863 B1 | 5/2003 | Megiddo | |
| 6,731,625 B1 | 5/2004 | Eastep | |
| 6,882,971 B2 | 4/2005 | Craner | |
| 7,046,780 B2 | 5/2006 | Kwan | |
| 7,107,312 B2 | 9/2006 | Hackbarth | |
| 7,266,091 B2 | 9/2007 | Singh | |
| 7,289,451 B2 | 10/2007 | Bruhn | |
| 7,362,349 B2 | 4/2008 | Nelson | |
| 7,404,001 B2 | 7/2008 | Campbell | |
| 7,417,959 B2 | 8/2008 | Dorner | |
| 7,503,006 B2 | 3/2009 | Danieli | |
| 7,535,995 B1 | 5/2009 | Firestone | |
| 7,864,209 B2 | 1/2011 | Jeong | |
| 7,870,192 B2 | 1/2011 | Greenlee | |
| 7,873,710 B2 | 1/2011 | Kiley | |
| 7,916,653 B2 | 3/2011 | Firestone | |
| 8,041,025 B2 | 10/2011 | Dolph | |
| 8,050,911 B2 | 11/2011 | Garudadri | |
| 8,078,462 B2 | 12/2011 | Shinohara | |
| 8,144,633 B2 | 3/2012 | Yoakum | |
| 8,165,271 B2 | 4/2012 | Djurovic | |
| 8,191,001 B2 | 5/2012 | Van Wie | |
| 8,218,751 B2 | 7/2012 | Hepworth | |
| 8,265,293 B2 | 9/2012 | Park | |
| 8,266,214 B2 | 9/2012 | Hon | |
| 8,300,078 B2 | 10/2012 | Lovhaugen | |
| 8,315,366 B2 | 11/2012 | Basart | |
| 8,315,409 B2 | 11/2012 | Amsterdam | |
| 8,320,572 B2 | 11/2012 | Liu | |
| 8,340,631 B2 | 12/2012 | Mann | |
| 8,378,807 B2 | 2/2013 | Lee | |
| 8,416,281 B2 | 4/2013 | Ogle | |
| 8,456,508 B2 | 6/2013 | Jeong | |
| 8,482,593 B2 | 7/2013 | Periyannan | |
| 2002/0098839 A1 * | 7/2002 | Ogino | G01S 5/02 455/424 |
| 2002/0126626 A1 | 9/2002 | Singh | |
| 2003/0118200 A1 | 6/2003 | Beaucoup | |
| 2004/0128350 A1 | 7/2004 | Topfl | |
| 2005/0144233 A1 | 6/2005 | Kjesbu | |
| 2005/0219366 A1 | 10/2005 | Hollowbush | |
| 2005/0271194 A1 | 12/2005 | Woods | |
| 2006/0132595 A1 | 6/2006 | Kenoyer | |
| 2007/0036146 A1 | 2/2007 | Adkins | |
| 2007/0111743 A1 | 5/2007 | Leigh | |
| 2007/0291108 A1 | 12/2007 | Huber | |
| 2008/0057937 A1 | 3/2008 | Kotelba | |
| 2008/0175399 A1 | 7/2008 | Kim | |
| 2008/0176576 A1 | 7/2008 | Diachina | |
| 2008/0312923 A1 | 12/2008 | Crinon | |
| 2009/0028061 A1 | 1/2009 | Zaencker | |
| 2009/0204922 A1 | 8/2009 | Bhattacharjee | |
| 2009/0254825 A1 | 10/2009 | Sichart | |
| 2009/0327425 A1 | 12/2009 | Gudipaty | |
| 2010/0082784 A1 | 4/2010 | Rosenblatt | |
| 2010/0235486 A1 * | 9/2010 | White | H04L 43/0858 709/223 |
| 2010/0261497 A1 | 10/2010 | Cooper | |
| 2011/0022203 A1 | 1/2011 | Woo | |
| 2011/0072367 A1 | 3/2011 | Bauer | |
| 2011/0085016 A1 | 4/2011 | Kristiansen | |
| 2011/0093273 A1 | 4/2011 | Lee | |
| 2011/0182415 A1 | 7/2011 | Jacobstein | |
| 2011/0216648 A1 | 9/2011 | Mehrotra | |
| 2011/0268263 A1 | 11/2011 | Jones | |
| 2011/0268418 A1 | 11/2011 | Jones | |
| 2011/0270922 A1 | 11/2011 | Jones | |
| 2011/0271192 A1 | 11/2011 | Jones | |
| 2011/0271209 A1 | 11/2011 | Jones | |
| 2011/0275412 A1 | 11/2011 | Khawand | |
| 2012/0005599 A1 | 1/2012 | Bastide | |
| 2012/0045068 A1 | 2/2012 | Kim | |
| 2012/0051533 A1 | 3/2012 | Byrne | |
| 2012/0069131 A1 | 3/2012 | Abelow | |
| 2012/0082304 A1 | 4/2012 | Byrne | |
| 2012/0148035 A1 | 6/2012 | Katis | |
| 2012/0204118 A1 | 8/2012 | Lefar | |
| 2012/0216131 A1 | 8/2012 | Moyers | |
| 2012/0246582 A1 | 9/2012 | Leacock | |
| 2012/0308044 A1 | 12/2012 | Vander Mey | |
| 2012/0327173 A1 | 12/2012 | Couse | |
| 2013/0031475 A1 | 1/2013 | Maor | |
| 2013/0120522 A1 | 5/2013 | Lian | |
| 2013/0139071 A1 | 5/2013 | Hoff | |
| 2013/0156204 A1 | 6/2013 | Schulz | |
| 2013/0169742 A1 | 7/2013 | Wu | |
| 2013/0198288 A1 | 8/2013 | Jones | |
| 2015/0030017 A1 | 1/2015 | Dickins | |
| 2015/0032446 A1 | 1/2015 | Dickins | |

FOREIGN PATENT DOCUMENTS

| | | |
|---|---|---|
| GB | 2463303 | 3/2010 |
| JP | 2006-171226 | 6/2006 |
| WO | 99/45685 | 9/1999 |
| WO | 2006/026221 | 3/2006 |
| WO | 2008/087621 | 7/2008 |
| WO | 2009/113777 | 9/2009 |
| WO | 2012/148455 | 11/2012 |
| WO | 2014/004259 | 1/2014 |
| WO | 2014/099809 | 6/2014 |
| WO | 2014/100331 | 6/2014 |

OTHER PUBLICATIONS

"The Dark Side of Video Conferencing" posted on Feb. 8, 2011 by Milton.

Kelkar, S. et al "Some Observations on the "live" Collaborative Tagging of Audio Conferences in the Enterprise" Apr. 10-15, 2010, Proc. of the SIGCHI Conference on Human Factors in Computing Systems, pp. 995-998.

Demeulemeester, A. et al "The ICOCOON Virtual Meeting Room: A Virtual Environment as a Support Tool for Multipoint Teleconference Systems" 11th International Conference on Entertainment Computing, Sep. 26, 2012-Sep. 29, 2012.

Kim, Chun-Geun et al "3-Dimensional Voice Communication System for Two User Groups" IEEE 7th International Conference on Advanced Communication Technology, vol. 1, Feb. 21-23, 2005.

Noma, H. et al "Multi-Point Virtual Space Teleconferencing System" IEICE Transactions on Communications, v E78- B, No. 7, pp. 970-979, Jul. 1995.

Correa, C.G. et al "Immersive Teleconferencing System Based on Vide-Avatar for Distance Learning" Symposium on Virtual Reality, 2011 XIII, May 23-26, 2011, pp. 197-206.

Jones, A. et al "HeadSPIN: A one-to-many 3D Video Teleconferencing System" ACM SIGGRAPH 2009 Emerging Technologies, Aug. 3-7, 2009, published by Association for Computing Machinery.

Yamazaki, Y. et al "Exploring Spatial Audio Conferencing Functionality in Multiuser Virtual Environments" Proc. of the Third International Conference on Collaborative Virtual Environments, pp. 207-208, 2000.

(56) References Cited

OTHER PUBLICATIONS

Ben Ford, S. et al "A Spatial Model of Interaction in Large Virtual Environments" Proc. of the Third European Conference on Computer-Supported Cooperative Work, Sep. 13-17, 1993, Milan, Italy, pp. 109-124.
Yao, L et al "FocalSpace: Multimodal Activity Tracking, Synthetic Blur and Adaptive Presentation for Video Conferencing" Jul. 20-21, 2013, SUI Proceedings of the 1st Symposium on Spatial User Interaction, pp. 73-76, ACM New York, NY, USA.
Anonymous "Microsoft Lync 2010 Puts the "U" in UC: Lync Server 2010 United Enterprise Telephony, IM, Video, Audio Conferencing, and Office apps" Nov. 29, 2010.

\* cited by examiner

NEAR-END INDICATION THAT THE END OF SPEECH IS RECEIVED BY THE FAR END IN AN AUDIO OR VIDEO CONFERENCE

CROSS-REFERENCE TO RELATED APPLICATIONS

This application claims priority to U.S. Provisional Patent Application No. 61/706,267 filed 27 Sep. 2012 and Chinese Patent Application No. 201310422060.8 filed 16 Sep. 2013, each of which is hereby incorporated by reference in its entirety.

TECHNICAL FIELD

The present disclosure relates generally to audio or video conferencing. More specifically, embodiments of the present disclosure relate to client devices for use in audio or video conference systems and methods of audio or video conferencing for use in client devices.

BACKGROUND

Audio or video conference systems can bring people located at different places together to have a meeting. By means of this technique, a virtual face-to-face talking scenario may be created for parties.

Parties may join a conference via their client devices. The clients devices are generally provided with microphones for audio input and speakers for audio output. The client devices may access to a conference system via communication connections such as network connections or telecommunication connections.

Some client devices may present information such as identifications of other parties and some controls such as volume control, to improve user experience in the conference. One example of these client devices may be found in for example, U.S. Pat. No. 5,539,741. However, users of these client devices usually suffer from disrupted communication (also called as collision) in audio or video conferences due to the inevitable delay in audio/video transmission. There is a need for a solution to at least mitigate the problems raised by the disrupted communication.

SUMMARY

According to an embodiment of the invention, a client device for use in an audio or video conference system includes an offset detecting unit, a configuring unit, an estimator and an output unit. The offset detecting unit detects an offset of speech input to the client device. For each of at least one far end, the configuring unit determines a voice latency from the client device to the far end. For each of the at least one far end, the estimator estimates a time when a user at the far end perceives the offset, based on the voice latency. For each of the at least one far end, the output unit outputs a perceivable signal indicating that a user at the far end perceives the offset based on the time estimated for the far end.

According to an embodiment of the invention, a client device for use in an audio or video conference system includes a receiving unit, a voice activity detector and an output unit. The receiving unit receives data frames. The voice activity detector detects voice activity in the data frames directly output from the receiving unit. The output unit outputs a perceivable signal indicating that there is incoming speech from a far end.

According to an embodiment of the invention, a method of audio or video conferencing for use in a client device is provided. According to the method, for each of at least one far end, a voice latency from the client device to the far end is determined. An offset of speech input to the client device is detected. For each of the at least one far end, a time when a user at the far end perceives the offset is estimated based on the voice latency. For each of the at least one far end, a perceivable signal indicating that a user at the far end perceives the offset is outputted based on the time estimated for the far end.

According to an embodiment of the invention, a method of audio or video conferencing for use in a client device is provided. According to the method, data frames are received. Voice activity is detected in the received data frames. A perceivable signal indicating that there is incoming speech from a far end is outputted.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

The embodiments of the present invention are below described by referring to the drawings. It is to be noted that, for purpose of clarity, representations and descriptions about those components and processes known by those skilled in the art but not necessary to understand the present invention are omitted in the drawings and the description.

As will be appreciated by one skilled in the art, aspects of the present invention may be embodied as a system, a device (e.g., a cellular telephone, portable media player, personal computer, television set-top box, or digital video recorder, or any media player), a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

To start a conference, parties (or users) of the conference may connect their client devices to an audio or video conference system. During the conference, the parties may speak to their client devices. The client devices may sample the speech and send the speech to other parties through the audio or video conference system. Speech from parties may be mixed by the audio or video conference system or by the receiving client devices, and then be present by the receiving devices. For the client device used by a party, client devices used by other parties are also called as far ends.

Figure 1:
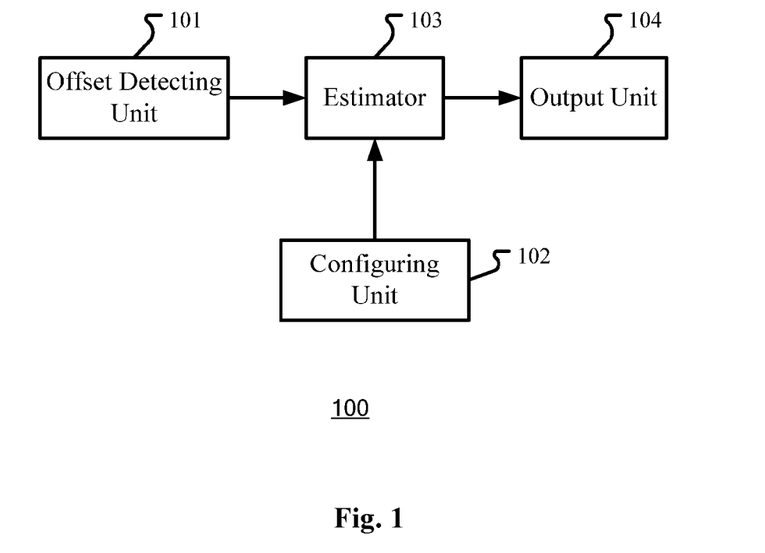
FIG. 1 is a block diagram illustrating an example client device for use in an audio or video conference system according to at least one of embodiments of the invention.

FIG. 1 is a block diagram illustrating an example client device 100 for use in an audio or video conference system (not illustrated in the figure) according to at least one of embodiments of the invention.

As illustrated in FIG. 1, the client device 100 includes an offset detecting unit 101, a configuring unit 102, an estimator 103 and an output unit 104.

The offset detecting unit 101 is configured to detect an offset of speech input to the client device 100. Onset of speech refers to the beginning of speech. Offset of speech refers to the ending of speech. In general, it is possible to detect an onset of speech, continuation of the speech and an offset of the speech from audio input to the client device 100 by means of voice activity detection (VAD) technique.

The offset represents the stop or pause of the speech. If the conference is proceeding politely, the offset may give a chance of speaking to other parties. Usually, there is a delay between the time of detecting the offset and the time of perceiving (for example, hearing) the offset by other parties because of existence of voice latency. Due to this delay, when a talking party stops or pauses talking, the party is not sure about the moments when other parties can perceive this stop or pause, when he or she may hear another party's speech if the other party starts to talk after perceiving the stop or pause, and when the party may restart talking with a lower possibility of collision with another party. An intuitive presentation of this delay to the talking party can be helpful for him to judge the moments.

Voice latency may be different for different parties. In the present embodiment, therefore, for each far end $C_i$ of far ends $C_1$–$C_n$, n>0, the configuring unit 102 is configured to determine voice latency $L_i$ from the client device 100 to the far end $C_i$.

Voice latency is the time delay incurred in speech by the audio or video conference system from the moment that the speaker utters a word until the listener actually hears the word. This is known as mouth-to-ear (MTE) delay or the one-way delay. For example, voice latency may comprise the following component delays:

preprocessing delay: packetization delay, serialization delay, and audio signal enhancement algorithm delay on the sending side; audio signal enhancement algorithm delay on the receiving side;

encoding delay: speech coding delay on the sending side;

decoding delay: speech decoding delay on the receiving side;

transmission delay:

network delay: backbone transmission delay, gateway delay, queuing delay, terminal link delay such as xDSL transmission/processing delay or radio link delay;

jitter buffer delay on the receiving side.

The preprocessing delay, encoding delay and decoding delay are relatively fixed, and therefore, may be measured or estimated in advance as configuration parameters. These configuration parameters may be stored or registered in a location such that the configuring unit 102 can access the configuration parameters. The configuring unit 102 may also present a user interface for inputting one or more of the configuration parameters. The configuring unit 102 may also communicate with modules for managing or monitoring the preprocessing process, encoding process or decoding process to inquiry for configuration parameters, if these modules can measure or collect these configuration parameters. One or more of the configuration parameters may be specific to different far ends or types of far ends, or may be applicable to all the far ends.

The transmission delay is generally dynamic. The configuring unit 102 may measure or collect the transmission delay online. For example, it is possible to measure the network delay by employing functions provided by network utilities such as Ping or communication protocols such as RTP Control Protocol (RTCP) where RTP refers to Real-Time Transport Protocol. Jitter buffers may be static or dynamic. In case of a static jitter buffer, its jitter buffer delay may be managed as a parameter in a location such that the configuring unit 102 can access the parameter. The configuring unit 102 may also present a user interface for inputting the configuration parameter. In case of a dynamic jitter buffer, a corresponding jitter buffer management module may maintain a parameter of average jitter buffer delay, or keep a parameter of jitter buffer delay update to date, in a location such that the configuring unit 102 can access the parameter. The configuring unit 102 may also communicate with the management module to inquiry for the parameter.

It is not necessary for the configuring unit 102 to acquire all the component delays in order to determine a voice latency. In fact, the component delays may be dominant or subordinate. Considering more component delays means more overhead and more accurate voice latency. There is a tradeoff between the overhead and the accuracy. For example, the configuring unit 102 may determine a voice latency mainly or only based on one or more most dominant component delays.

It is observed that the transmission delay is usually dominant among the component delays. In an example, the configuring unit 102 may determine the voice latency only or mainly based on the transmission delay. In this example, it is possible to acquire an accurate voice latency with lower overhead. Further, one or more of the preprocessing delay, encoding delay, and decoding delay may also be considered.

It is also observed that the network delay is usually more dominant than the jitter buffer delay in the transmission delay. In an example, the configuring unit 102 may acquire the network delay as the transmission delay. In this example, it is possible to acquire an accurate voice latency with much lower overhead.

The configuring unit 102 may determine the voice latency for any number of times. In addition, the configuring unit 102 may update the voice latency regularly or in response to a signal indicating a change in configuration of the route from the client device to the far end. For example, the change in configuration comprises but not limited to change in jitter buffer, and change in network path. The configuring unit 102 may update the voice latency in response to an increase of collisions between relevant parties.

In the present embodiment, for each far end $C_i$, the estimator 103 is configured to estimate a time $t_{1,i}$ when a party at the far end $C_i$ perceives the offset based on the voice latency $L_i$. For example, assuming that the offset is detected at time $t_{0,i}$, then $t_{1,i}=+L_i$.

For each far end $C_i$, the output unit 104 is configured to output a perceivable signal indicating that a party at the far end $C_i$ perceives the offset based on the time $t_{1,i}$. The perceivable signal may be implemented as audio, visual or combination thereof. The perceivable signal may be implemented in a progressive manner or in a transient manner.

Under the progressive manner, the perceivable signal presents a perceivable change from one state to another state in a consistent direction as the present time approaches the time $t_{1,i}$, indicating to the user that the offset are approaching the far end $C_i$. If the perceivable signal changes to a perceivable final state when the present time reaches the time $t_{1,i}$, the user can be informed that the offset has reached the far end $C_i$ and can be perceived by the user. Because it is possible to perceive the process of approaching and the distance between the present state and the final state, the user at the client device 100 may obtain an expectation on when the offset will be perceived at the far end. This is helpful to improve the user's experience.

Figure 2A:
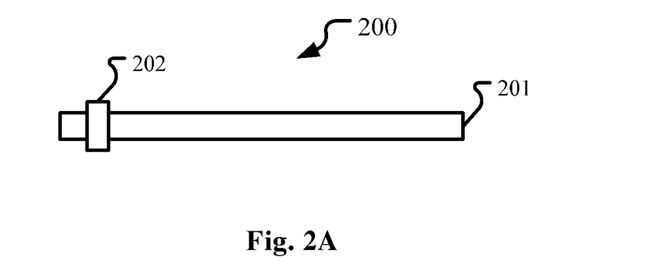
FIG. 2A is a schematic view illustrating an example of visual perceivable signals present in a progressive manner according to at least one of embodiments of the invention.

FIG. 2A is a schematic view illustrating an example of visual perceivable signals present in the progressive manner. As illustrated in FIG. 2A, a visual object 200 including two bars 201 and 202 is displayed. The bar 201 represents the voice latency from the client device to a far end, and the bar 202 represents the present time. A position of the bar 202 on the bar 201 represent one state of the perceivable signal. An initial state where the bar 202 locates at one end of the bar 201 represents the beginning of the transmission of the offset. Another state where the bar 202 locates at another end of the bar 201 represents the final state. As the time elapses, the bar 202 move from one end to another end, then the state changes from the initial state to the final state. Another example is a countdown timer for counting down the voice latency.

Under the transient manner, the perceivable signal is output in response to the present time reaching to time $t_{1,i}$. This manner is simple and direct, and therefore, the user may pay less attention before the perceivable signal emerges.

Figure 2B:
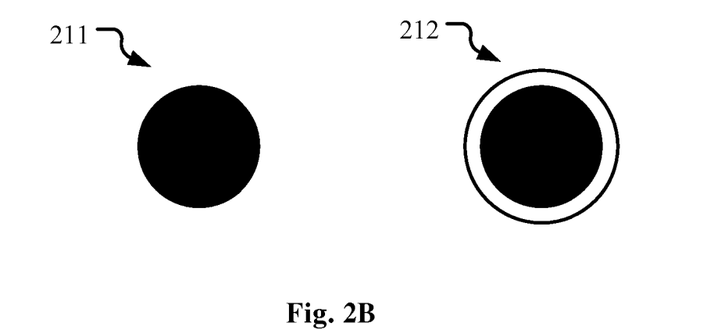
FIG. 2B is a schematic view illustrating an example of visual perceivable signals present in a transient manner according to at least one of embodiments of the invention.

FIG. 2B is a schematic view illustrating an example of visual perceivable signals present in the transient manner. As illustrated in FIG. 2B, a visual object 211 is a solid circle representing a far end in a state where the offset has not yet arrived. If the time estimated by the estimator has elapsed and the output unit responds to this event by presenting a perceivable signal, the output unit makes the visual object 211 change to another visual object 212. The visual object 212 is displayed as a solid circle surrounded by a ring rendered with a color different from that of the solid circle. In this example, the perceivable signal is implemented as the visual object 212.

The perceivable signal may also be present in a combined manner of the progressive manner and the transient manner.

Figure 2C:
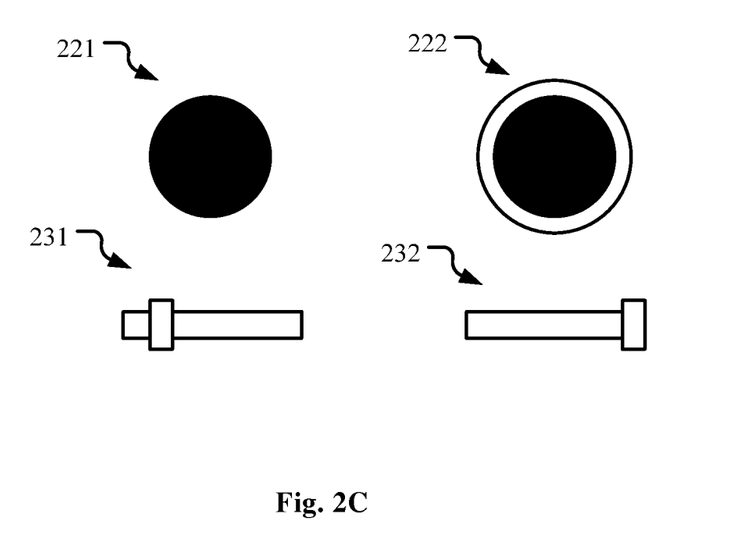
FIG. 2C is a schematic view illustrating an example of visual perceivable signals present in a combined manner according to at least one of embodiments of the invention.

FIG. 2C is a schematic view illustrating an example of visual perceivable signals present in the combined manner. As illustrated in FIG. 2C, in a state where the offset has not yet arrived, a visual object 221 and a visual object 231 are displayed. In this state, the visual object 221 is present in the same way as the visual object 211, and the visual object 231 is present in the same way as the visual object 200. If the time estimated by the estimator has elapsed and the output unit responds to this event by presenting a perceivable signal, the output unit makes the visual object 221 change to another visual object 222, and makes the visual object 231 change to another visual object 232. In this example, the perceivable signal is implemented as a combination of the visual objects 222 and 232.

Figure 2D:
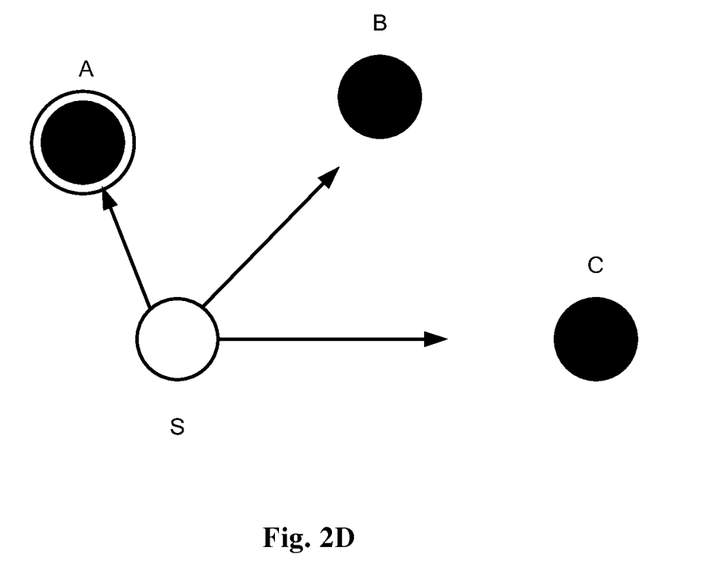
FIG. 2D is a schematic view illustrating another example of visual perceivable signals present in a combined manner according to at least one of embodiments of the invention.

FIG. 2D is a schematic view illustrating another example of visual perceivable signals present in the combined manner. As illustrated in FIG. 2D, a visual object representing the present speaker is displayed as a hollow circle, and three far ends are represented as visual objects A, B and C which are displayed in the same way as the visual object illustrated in FIG. 2B. Arrowed lines are displayed between the visual object S and the visual objects A, B and C respectively. The lines represent the progress of the offset transmission between the visual object S and the visual objects A, B and C respectively. As the offset approaches a far end, the line between the visual object S and the visual object x representing the far end extends with the arrow approaching the visual object x (for example, visual object B or C). If the time estimated for the far end by the estimator has elapsed and the output unit responds to this event by presenting a perceivable signal, the output unit makes the line between the visual object S and the visual object x (for example, visual object A) extends with the arrow contacting the visual object x, and makes the visual object x change to the same state of that of the visual object 212.

Under the transient manner, there may be three states: initial state where there is speech activity, transmission state where an offset has been detected and is under transmission, and final state where the offset has arrived. For example, a perceivable signal may be displayed as the visual objects 211 and 212 respectively to represent the transmission state and the final state, and may be displayed as a different object (for example, a hollow circle) to represent the initial state.

Any perceivable difference in color, shape, size, or dynamic visual effect such as moving, flashing or fading may represent a change in state.

In the embodiment illustrated in FIG. 1, the client device 100 present the perceivable signal for all the far ends joining the conference. In some situations, it is not necessary to present the perceivable signal for all the far ends joining the conference. For example, if it is known that parties at some far ends will not talk, these far ends may be excluded. In an alternative embodiment, the client device 100 may present the perceivable signal only for one far end having the largest voice latency among all the far ends. This can help the user of the client device 100 make sure that all the other parties have perceived the offset. Further, because only one perceivable signal is present, the user is not likely to be disturbed.

Figure 3:
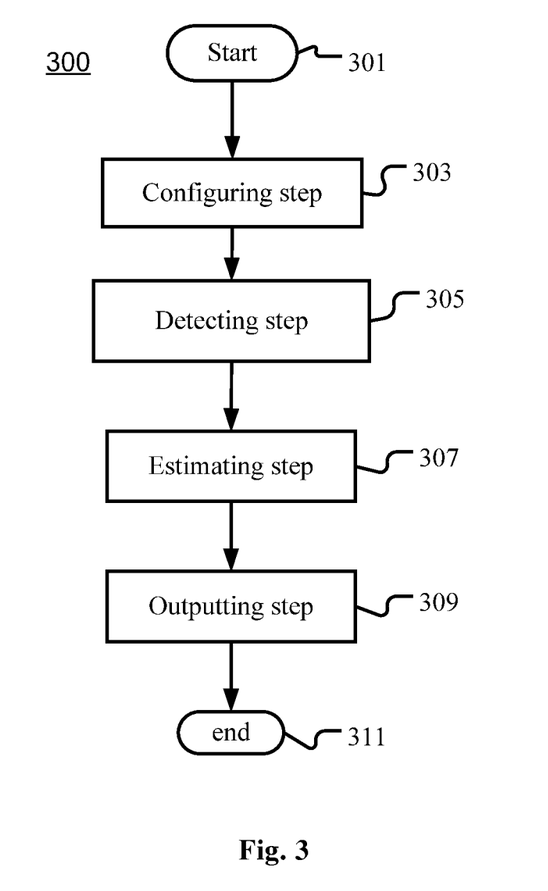
FIG. 3 is a flow chart illustrating an example method of audio or video conferencing for use in a client device according to at least one of embodiments of the invention.

FIG. 3 is a flow chart illustrating an example method 300 of audio or video conferencing for use in a client device according to at least one of embodiments of the invention.

As illustrated in FIG. 3, the method 300 starts from step 301. At step 303, for each far end $C_i$ of far ends $C_1$–$C_n$, n>0, a voice latency $L_i$ from the client device to the far end $C_i$ is determined. At step 305, an offset is detected from speech input to the client device. At step 307, for each far end $C_i$, a time $t_{1,i}$ when a party at the far end $C_i$ perceives the offset is estimated based on the voice latency $L_i$. At step 309, for each far end $C_i$, a perceivable signal indicating that a party at the far end $C_i$ perceives the offset is output based on the time $t_{1,i}$. The method 300 ends at step 311. Although the method 300 is executed once in FIG. 3, it can be repeated as required.

In an alternative embodiment of the method 300, at step 303, it is possible to determine the voice latency only or mainly based on the transmission delay. Further, one or more of the preprocessing delay, encoding delay, and decoding delay may also be considered.

In an alternative embodiment of the method 300, at step 303, it is possible to acquire the network delay as the transmission delay.

In a further embodiment of the method 300, step 303 may be executed for any number of times. In addition, it is possible to update the voice latency regularly or in response to a signal indicating a change in configuration of the route from the client device to the far end. It is also possible to update the voice latency in response to an increase of collisions between relevant parties.

In the embodiment illustrated in FIG. 3, at step 309, a perceivable signal is present for each of the far ends joining the conference. In some situations, it is not necessary to present the perceivable signal for all the far ends joining the conference. In an alternative embodiment, it is possible to present the perceivable signal only for one far end having the largest voice latency among all the far ends.

Figure 4:
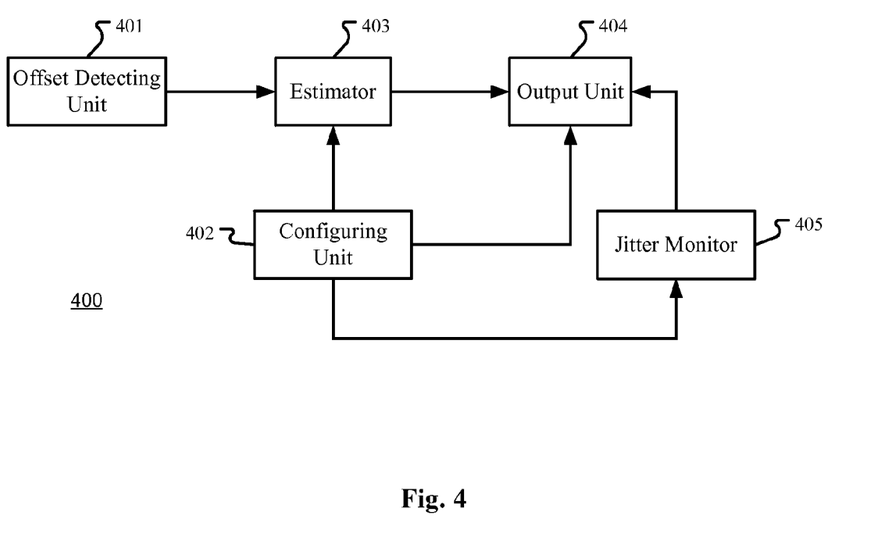
FIG. 4 is a block diagram illustrating an example client device for use in an audio or video conference system according to at least one of embodiments of the invention.

FIG. 4 is a block diagram illustrating an example client device 400 for use in an audio or video conference system according to at least one of embodiments of the invention.

As illustrated in FIG. 4, the client device 400 includes an offset detecting unit 401, a configuring unit 402, an estimator 403, an output unit 404 and a jitter monitor 405. The offset detecting unit 401 and the estimator 403 have the same functions as that of the offset detecting unit 101 and the estimator 103 respectively, and will not be described here in detail.

The configuring unit 402 has the same function as that of the configuring unit 102. Especially, configuring unit 402 is configured to determine a network delay of a route from the client device 400 to each of the far ends. The jitter monitor 405 is configured to acquire jitter range of the network delay. The output unit 404 has the same function as that of the output unit 104. In addition, the output unit 404 is further configured to present the network delay of the route and the jitter range. The voice latency determined by the configuring unit 402 based on the network delay may sometimes depart from the actual voice latency if the jitter of the network delay is larger. The present embodiment is helpful for the user to have a knowledge on the possibly largest network delay, and then to increase the possibility of avoiding collision.

In a further embodiment of the method 300 as illustrated in FIG. 3, the method 300 further comprises a step of determining a network delay of a route from the client device to the at least one far end, a step of acquiring jitter range of the network delay, and a step of presenting the network delay of the route and the jitter range.

In a further embodiment of the client device described in the above, the client device further comprises a jitter buffer tuner configured to, in response to a user input, adjust the jitter buffer delay of a jitter buffer on a route from the client device to a far end. The jitter buffer tuner may select one of routes from the client device to all the far ends or one of jitter buffers on a route according to the user input. Different far ends may have different voice latencies. It is possible to adjust the jitter buffer delay to reduce the difference between voice latencies of different far ends. Further, the client device may comprise a transmitting unit configured to, in response to the adjusting, transmit to the far end of the corresponding route an indication that the jitter buffer delay of the jitter buffer has been changed. This indication functions as a signal to inform of a change in route configuration. In response to this signal, a client device according to embodiments of the invention may update the associated voice latency. Further, the indication may comprise the adjusted jitter buffer delay of the jitter buffer. In this case, the receiving client device may directly update the associated voice latency based on the adjusted jitter buffer delay.

In a further embodiment of the method described in the above, the method may further comprise, in response to a user input, adjusting the jitter buffer delay of a jitter buffer on a route from the client device to a far end. It is possible to select one of routes from the client device to all the far ends or one of jitter buffers on a route according to the user input. Further, the method may comprise, in response to the adjusting, transmitting to the far end of the corresponding route an indication that the jitter buffer delay of the jitter buffer has been changed. Further, the indication may comprise the adjusted jitter buffer delay of the jitter buffer.

In a further embodiment of the client device described in the above, the output unit may be further configured to, for each of the other parties, output another perceivable signal in response to elapsing of a time interval after outputting the perceivable signal indicating that the offset has been perceived. This another perceivable signal may be audio, visual or combination thereof. The configuring unit may be further configured to determine the time interval as not less than a voice latency from the far end to the client device. The configuring unit may simply take the voice latency from the client device to the far end as the voice latency from the far end to the client device, or rely on the far end to determine the voice latency from the far end to the client device. This another perceivable signal is helpful for the user to judge when speech from the far end, if the user at the far end talks after he perceives the offset, is expected to arrive.

In a further embodiment of the method described in the above, the method may further comprise, for each of the other parties, outputting another perceivable signal in response to elapsing of a time interval after outputting the perceivable signal indicating that the offset has been perceived. This another perceivable signal may be audio, visual or combination thereof. The time interval is set as not less than a voice latency from the far end to the client device.

In a further embodiment of the client device described in the above, the output unit may be further configured to output one of subtle reverb, and noticeable noise field not audible to other parties during a period after detecting the offset and before outputting the perceivable signal indicating that the offset has been perceived at the far end. This output is helpful for the user to be aware that the offset has not yet been perceived. The far end may be any far end if there are more than one far ends. This output may be interrupted by any speech input from the local or from a far end.

In a further embodiment of the method described in the above, the method may further comprise outputting one of subtle reverb, and noticeable noise field not audible to other parties during a period after detecting the offset and before outputting the perceivable signal indicating that the offset has been perceived at the far end. The far end may be any far end if there are more than one far ends. This output may be interrupted by any speech input from the local or from a far end.

Figure 5:
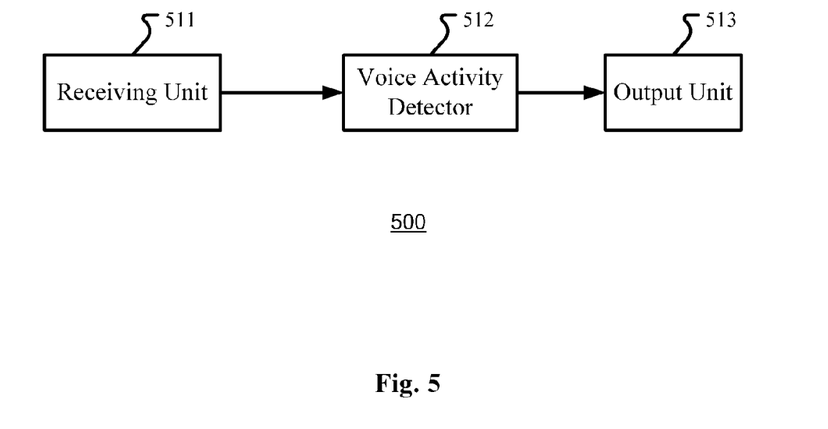
FIG. 5 is a block diagram illustrating an example client device for use in an audio or video conference system according to at least one of embodiments of the invention.

FIG. 5 is a block diagram illustrating an example client device 500 for use in an audio or video conference system according to at least one of embodiments of the invention.

As illustrated in FIG. 5, the client device 500 includes a receiving unit 511, a voice activity detector 512, and an output unit 513.

The receiving unit 511 is configured to receive data frames. The data frames are directly supplied from the receiving unit 511 to the voice activity detector 512. The voice activity detector 512 is configured to detect voice activity in the data frames. If voice activity is detected in the data frames, this means that there is incoming speech from a far end. The output unit 513 is configured to output a perceivable signal indicating that there is incoming speech from a far end. The perceivable signal may be audio, visual or combination thereof. In this way, if there is incoming speech, the user of the client device 500 can be aware of this earlier, without experiencing delays such as jitter buffer delay and playback delay. This earlier awareness is helpful for the user to avoid collision.

The perceivable signal may be present in the transient manner, where the perceivable signal may present two states: a state where there is no speech activity and another state where there is speech activity.

This feature of earlier awareness may be combined in any embodiment of outputting the perceivable signal indicating that the offset has been perceived as described in the above.

Figure 6:
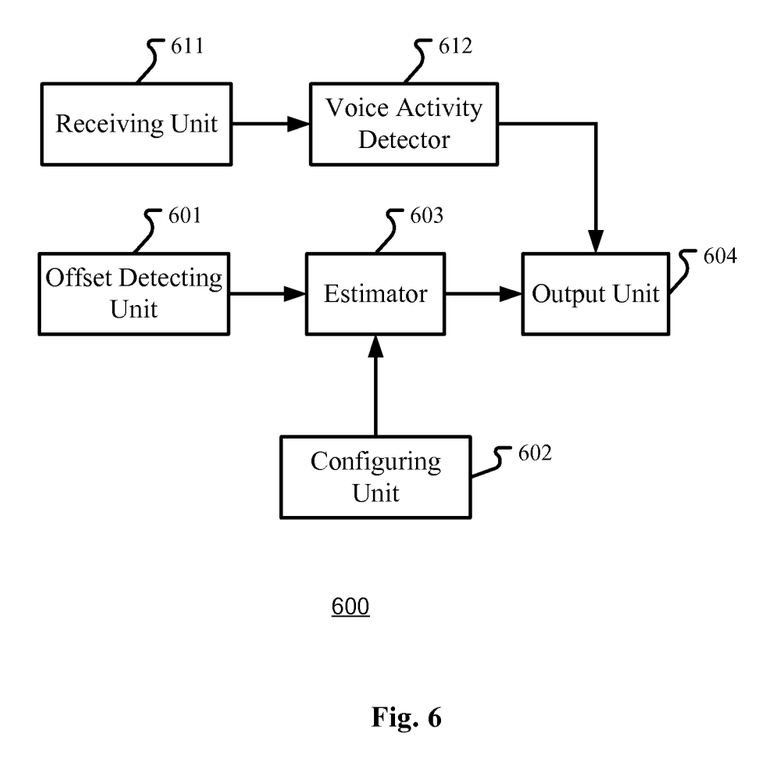
FIG. 6 is a block diagram illustrating an example client device for use in an audio or video conference system according to at least one of embodiments of the invention.

As an example of such combination, FIG. 6 is a block diagram illustrating an example client device 600 for use in an audio or video conference system according to at least one of embodiments of the invention.

As illustrated in FIG. 6, the client device 600 includes an offset detecting unit 601, a configuring unit 602, an estimator 603, an output unit 604, a receiving unit 611 and a voice activity detector 612.

The offset detecting unit 601, the configuring unit 602, the estimator 603, the receiving unit 611 and the voice activity detector 612 have the same functions as that of the offset detecting unit 101, the configuring unit 102, the estimator 103, the receiving unit 511 and the voice activity detector 512 respectively, and will not be described here in detail. The output unit 604 has the same function as that of the output unit 104. In addition, the output unit 604 is further configured to output the perceivable signal indicating that there is incoming speech from a far end.

In a further embodiment of the client device as described in the above, the voice activity detector may be further configured to detect voice activity from local audio input such as audio input via microphone. The output unit may be further configured to output a perceivable signal indicating that there is a collision if both voice activities are detected from the data frames and the local audio input at the same time.

In a further embodiment of the client device as described in the above, the output unit may be further configured to output a perceivable signal indicating that a far end is muted if no voice activity is detected from the data frames from the far end over a predetermined period of time or in response to a status notification.

Figure 7:
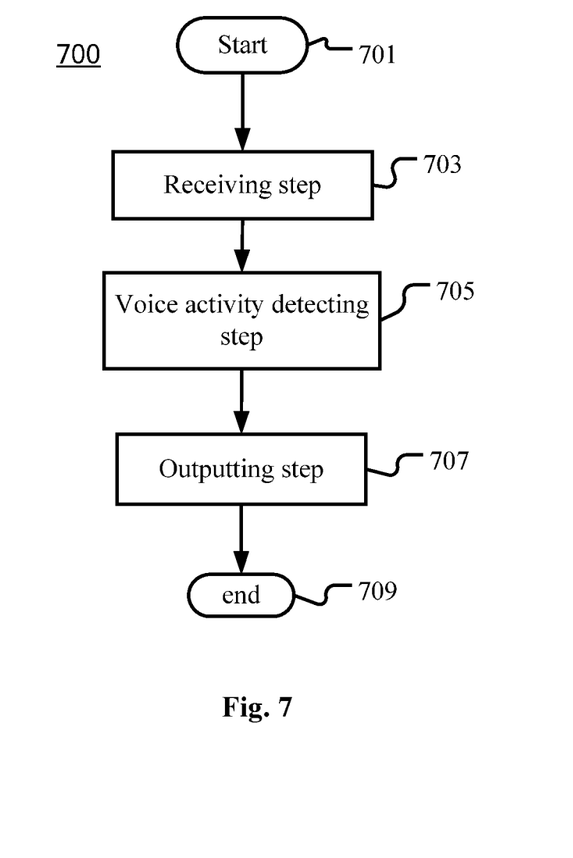
FIG. 7 is a flow chart illustrating an example method of audio or video conferencing for use in a client device according to at least one of embodiments of the invention.

FIG. 7 is a flow chart illustrating an example method 700 of audio or video conferencing for use in a client device according to at least one of embodiments of the invention.

As illustrated in FIG. 7, the method 700 starts from step 701. At step 703, data frames are received. The data frames are directly supplied for processing of step 705. At step 705, voice activity is detected from the data frames. If voice activity is detected in the data frames, this means that there is incoming speech from a far end. At step 707, a perceivable signal is outputted, indicating that there is incoming speech from a far end. The method 700 ends at step 709. Although the method 700 is executed once in FIG. 7, it can be repeated as required.

The method 700 may be combined in any embodiment of outputting the perceivable signal indicating that the offset has been perceived as described in the above.

As an example of such combination, in a further embodiment of the method 300, the method 300 may further comprise a receiving step of receiving data frames, and a voice activity detecting step of detecting voice activity in the data frames received through the receiving step. The outputting step may further comprise outputting a perceivable signal indicating that there is incoming speech from a far end.

In a further embodiment of the method as described in the above, the method may further comprise a step of detecting voice activity from local audio input such as audio input via microphone. A perceivable signal indicating that there is a collision may be outputted if both voice activities are detected from the data frames and the local audio input at the same time.

In a further embodiment of the method as described in the above, it is possible to output a perceivable signal indicating that a far end is muted if no voice activity is detected from the data frames from the far end over a predetermined period of time or in response to a status notification.

Figure 8:
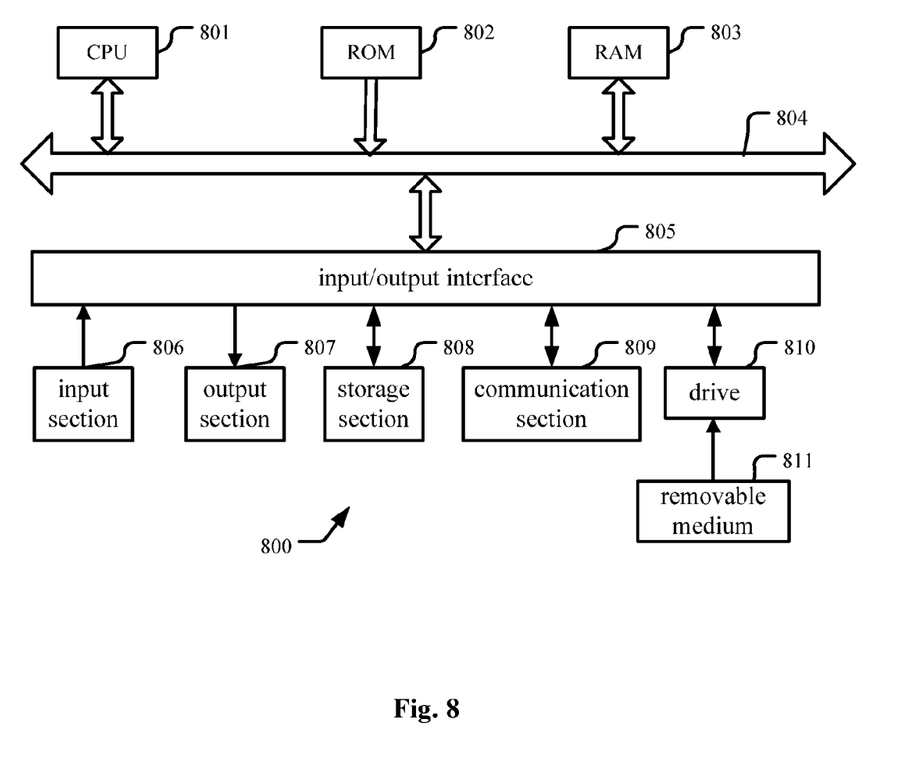
FIG. 8 is a block diagram illustrating an exemplary system for implementing embodiments of the present invention.

FIG. 8 is a block diagram illustrating an exemplary system 800 for implementing embodiments of the present invention.

In FIG. 8, a central processing unit (CPU) 801 performs various processes in accordance with a program stored in a read only memory (ROM) 802 or a program loaded from a storage section 808 to a random access memory (RAM) 803. In the RAM 803, data required when the CPU 801 performs the various processes or the like are also stored as required.

The CPU 801, the ROM 802 and the RAM 803 are connected to one another via a bus 804. An input/output interface 805 is also connected to the bus 804.

The following components are connected to the input/output interface 805: an input section 806 including a keyboard, a mouse, or the like; an output section 807 including a display such as a cathode ray tube (CRT), a liquid crystal display (LCD), or the like, and a loudspeaker or the like; the storage section 808 including a hard disk or the like; and a communication section 809 including a network interface card such as a LAN card, a modem, or the like. The communication section 809 performs a communication process via the network such as the internet.

A drive 810 is also connected to the input/output interface 805 as required. A removable medium 811, such as a magnetic disk, an optical disk, a magneto-optical disk, a semiconductor memory, or the like, is mounted on the drive 810 as required, so that a computer program read therefrom is installed into the storage section 808 as required.

In the case where the above-described steps and processes are implemented by the software, the program that constitutes the software is installed from the network such as the internet or the storage medium such as the removable medium 811.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. A client device for use in an audio or video conference system, comprising: an offset detecting unit configured to detect an offset of speech input to the client device;

a configuring unit configured to, for each of at least one far end, determine a first voice latency from the client device to the far end;

an estimator configured to, for each of the at least one far end, estimate a time when a user at the far end perceives the offset, based on the first voice latency; and an output unit configured to, for each of the at least one far end, output a first perceivable signal indicating that a user at the far end perceives the offset based on the time estimated for the far end.

EE 2. The client device according to EE 1, wherein the at least one far end comprises only one far end having the largest first voice latency among all the far ends involving a conference with the client device.

EE 3. The client device according to EE 1 or 2, wherein the configuring unit is further configured to determine the first voice latency at least based on a transmission delay from the client device to the far end.

EE 4. The client device according to EE 3, wherein the configuring unit is further configured to determine the first voice latency regularly or in response to a signal indicating a change in configuration of the route from the client device to the far end.

EE 5. The client device according to EE 3, wherein the configuring unit is further configured to acquire a network delay from the client device to the far end as the transmission delay.

EE 6. The client device according to EE 3, wherein the configuring unit is further configured to
acquire at least one of preprocessing delay, encoding delay, and decoding delay on a route from the client device to the far end; and
determine the first voice latency at least based on the transmission delay and the at least one acquired delay.

EE 7. The client device according to EE 1 or 2, wherein the configuring unit is further configured to determine a network delay of a route from the client device to the at least one far end,
further comprising a jitter monitor configured to acquire jitter range of the network delay, and
the output unit is further configured to present the network delay of the route and the jitter range.

EE 8. The client device according to EE 1 or 2, further comprising a jitter buffer tuner configured to, in response to a user input, adjust the jitter buffer delay of a jitter buffer on a route from the client device to the at least one far end.

EE 9. The client device according to EE 8, further comprising a transmitting unit configured, in response to the adjusting, to transmit to the far end of the corresponding route an indication that the jitter buffer delay of the jitter buffer has been changed.

EE 10. The client device according to EE 9, wherein the indication further comprises the adjusted jitter buffer delay of the jitter buffer.

EE 11. The client device according to EE 3, wherein the output unit is further configured to, for each of the at least one far end, output a second perceivable signal in response to elapsing of a time interval after outputting the first perceivable signal, and
wherein the configuring unit is further configured to determine the time interval as not less than a second voice latency from the far end to the client device.

EE 12. The client device according to EE 1, wherein the first perceivable signal comprises audio, visual or combination thereof.

EE 13. The client device according to EE 11, wherein the second perceivable signal comprises audio, visual or combination thereof.

EE 14. The client device according to EE 1, wherein the output unit is further configured to output one of subtle reverb, and noticeable noise field not audible to other parties during a period after detecting the offset and before outputting the first perceivable signal.

EE 15. The client device according to EE 1 or 2, further comprising:
a receiving unit configured to receive data frames; and
a voice activity detector configured to detect voice activity in the data frames directly output from the receiving unit,
wherein the output unit is further configured to output a third perceivable signal indicating that there is incoming speech from a far end.

EE 16. The client device according to EE 5, wherein the voice activity detector is further configured to detect voice activity from local audio input, and
the output unit is further configured to output a fourth perceivable signal indicating that there is a collision if both voice activities are detected from the data frames and the local audio input at the same time.

EE 17. The client device according to EE 15, wherein the output unit is further configured to output a fifth perceivable signal indicating that a far end is muted if no voice activity is detected from the data frames from the far end over a predetermined period of time or in response to a status notification.

EE 18. The client device according to EE 15, wherein the perceivable signal comprises audio, visual or combination thereof.

EE 19. A client device for use in an audio or video conference system, comprising:
a receiving unit configured to receive data frames;
a voice activity detector configured to detect voice activity in the data frames directly output from the receiving unit; and
an output unit configured to output a perceivable signal indicating that there is incoming speech from a far end.

EE 20. The client device according to EE 19, wherein the voice activity detector is further configured to detect voice activity from local audio input, and
the output unit is further configured to output another perceivable signal indicating that there is a collision if both voice activities are detected from the data frames and the local audio input at the same time.

EE 21. The client device according to EE 19, wherein the output unit is further configured to output another perceivable signal indicating that a far end is muted if no voice activity is detected from the data frames from the far end over a predetermined period of time or in response to a status notification.

EE 22. The client device according to EE 19, wherein the perceivable signal comprises audio, visual or combination thereof.

EE 23. A method of audio or video conferencing for use in a client device, comprising:
a configuring step of, for each of at least one far end, determining a first voice latency from the client device to the far end;
a detecting step of detecting an offset of speech input to the client device;
an estimating step of, for each of the at least one far end, estimating a time when a user at the far end perceives the offset, based on the first voice latency; and
an outputting step of, for each of the at least one far end, outputting a first perceivable signal indicating that a user at the far end perceives the offset based on the time estimated for the far end.

EE 24. The method according to EE 23, wherein the at least one far end comprises only one far end having the largest first voice latency among all the far ends involving a conference.

EE 25. The method according to EE 23 or 24, wherein the configuring step further comprises determining the first voice latency at least based on a transmission delay from the client device to the far end.

EE 26. The method according to EE 25, wherein the configuring step further comprises determining the first voice latency regularly or in response to a signal indicating a change in configuration of the route from the client device to the far end.

EE 27. The method according to EE 25, wherein the configuring step further comprises acquiring a network delay from the client device to the far end as the transmission delay.

EE 28. The method according to EE 25, wherein the configuring step further comprises:

acquiring at least one of preprocessing delay, encoding delay, and decoding delay on a route from the client device to the far end; and determining the first voice latency at least based on the transmission delay and the at least one acquired delay.

EE 29. The method according to EE 23 or 24, further comprising:

determining a network delay of a route from the client device to the at least one far end, acquiring jitter range of the network delay, and presenting the network delay of the route and the jitter range.

EE 30. The method according to EE 23 or 24, further comprising, in response to a user input, adjusting the jitter buffer delay of a jitter buffer on a route from the client device to the at least one far end.

EE 31. The method according to EE 30, further comprising, in response to the adjusting, transmitting to the far end of the corresponding route an indication that the jitter buffer delay of the jitter buffer has been changed.

EE 32. The method according to EE 31, wherein the indication further comprises the adjusted jitter buffer delay of the jitter buffer.

EE 33. The method according to EE 25, further comprising: for each of the at least one far end, outputting a second perceivable signal in response to elapsing of a time interval after outputting the first perceivable signal, and wherein the time interval is set as not less than a second voice latency from the far end to the client device.

EE 34. The method according to EE 23, wherein the first perceivable signal comprises audio, visual or combination thereof.

EE 35. The method according to EE 33, wherein the second perceivable signal comprises audio, visual or combination thereof.

EE 36. The method according to EE 23, further comprising outputting one of subtle reverb, and noticeable noise field not audible to other parties during a period after detecting the offset and before outputting the first perceivable signal.

EE 37. The method according to EE 23 or 24, further comprising:

a receiving step of receiving data frames; and a voice activity detecting step of detecting voice activity in the data frames received through the receiving step, wherein the outputting step further comprises outputting a third perceivable signal indicating that there is incoming speech from a far end.

EE 38. The method according to EE 37, further comprising:

detecting voice activity from local audio input, and outputting a fourth perceivable signal indicating that there is a collision if both voice activities are detected from the data frames and the local audio input at the same time.

EE 39. The method according to EE 37, further comprising outputting a fifth perceivable signal indicating that a far end is muted if no voice activity is detected from the data frames from the far end over a predetermined period of time or in response to a status notification.

EE 40. The method according to EE 37, wherein the perceivable signal comprises audio, visual or combination thereof.

EE 41. A method of audio or video conferencing for use in a client device, comprising:

a receiving step of receiving data frames;

a voice activity detecting step of detecting voice activity in the data frames received through the receiving step; and an outputting step of outputting a perceivable signal indicating that there is incoming speech from a far end.

EE 42. The method according to EE 41, further comprising:

detecting voice activity from local audio input, and outputting another perceivable signal indicating that there is a collision if both voice activities are detected from the data frames and the local audio input at the same time.

EE 43. The method according to EE 41, further comprising outputting another perceivable signal indicating that a far end is muted if no voice activity is detected from the data frames from the far end over a predetermined period of time or in response to a status notification.

EE 44. The method according to EE 41, wherein the perceivable signal comprises audio, visual or combination thereof.

We claim:

1. A client device for use in an audio or video conference system, comprising:

an offset detecting unit configured to detect an offset of speech input to the client device;

a configuring unit configured to, for each of at least one far end, determine a first voice latency from the client device to the far end;

an estimator configured to, for each of the at least one far end, estimate a time when a user at the far end perceives the offset, based on the first voice latency; and an output unit configured to, for each of the at least one far end, output a first perceivable signal indicating that a user at the far end perceives the offset based on the time estimated for the far end; wherein the output unit is configured to output one of subtle reverb and noticeable noise field not audible to other parties during a period after the offset detecting unit detects the offset and before the output unit outputs the first perceivable signal.

2. The client device according to claim 1, wherein the at least one far end comprises only one far end having the largest first voice latency among all the far ends involving a conference with the client device.

3. The client device according to claim 1, wherein the configuring unit is further configured to determine the first voice latency at least based on a transmission delay from the client device to the far end.

4. The client device according to claim 3, wherein the configuring unit is further configured to acquire a network delay from the client device to the far end as the transmission delay.

5. The client device according to claim 1, wherein the configuring unit is further configured to determine a network delay of a route from the client device to the at least one far end, further comprising a jitter monitor configured to acquire jitter range of the network delay, and the output unit is further configured to present the network delay of the route and the jitter range.

6. The client device according to claim 1, further comprising a jitter buffer tuner configured to, in response to a user input, adjust the jitter buffer delay of a jitter buffer on a route from the client device to the at least one far end.

7. The client device according to claim 6, further comprising a transmitting unit configured, in response to the adjusting, to transmit to the far end of the corresponding route an indication that the jitter buffer delay of the jitter buffer has been changed.

8. The client device according to claim 3, wherein the output unit is further configured to, for each of the at least one far end, output a second perceivable signal in response to elapsing of a time interval after outputting the first perceivable signal, and
wherein the configuring unit is further configured to determine the time interval as not less than a second voice latency from the far end to the client device.

9. The client device according to claim 1, further comprising:
a receiving unit configured to receive data frames; and
a voice activity detector configured to detect voice activity in the data frames directly output from the receiving unit,
wherein the output unit is further configured to output a third perceivable signal indicating that there is incoming speech from a far end.

10. The client device according to claim 9, wherein the voice activity detector is further configured to detect voice activity from local audio input, and
the output unit is further configured to output a fourth perceivable signal indicating that there is a collision if both voice activities are detected from the data frames and the local audio input at the same time.

11. A client device for use in an audio or video conference system, comprising:
a receiving unit configured to receive data frames;
a voice activity detector configured to detect voice activity in the data frames directly output from the receiving unit; and
an output unit configured to output a perceivable signal indicating that there is incoming speech from a far end,
wherein the voice activity detector is further configured to detect voice activity from local audio input, and
the output unit is further configured to output another perceivable signal indicating that there is a collision if both voice activities are detected from the data frames and the local audio input at the same time.

12. A method of audio or video conferencing for use in a client device, comprising:
a configuring step of, for each of at least one far end, determining a first voice latency from the client device to the far end;
a detecting step of detecting an offset of speech input to the client device;
an estimating step of, for each of the at least one far end, estimating a time when a user at the far end perceives the offset, based on the first voice latency;
an outputting step of, for each of the at least one far end, outputting a first perceivable signal indicating that a user at the far end perceives the offset based on the time estimated for the far end; and
outputting one of subtle reverb and noticeable noise field not audible to other parties during a period after detecting the offset and before outputting the first perceivable signal.

13. The method according to claim 12, wherein the configuring step further comprises determining the first voice latency at least based on a transmission delay from the client device to the far end.

14. The method according to claim 12, further comprising:
determining a network delay of a route from the client device to the at least one far end,
acquiring jitter range of the network delay, and
presenting the network delay of the route and the jitter range.

15. The method according to claim 12, further comprising, in response to a user input, adjusting the jitter buffer delay of a jitter buffer on a route from the client device to the at least one far end.

16. The method according to claim 15, further comprising, in response to the adjusting, transmitting to the far end of the corresponding route an indication that the jitter buffer delay of the jitter buffer has been changed,
wherein the indication further comprises the adjusted jitter buffer delay of the jitter buffer.

17. The method according to claim 13, further comprising: for each of the at least one far end, outputting a second perceivable signal in response to elapsing of a time interval after outputting the first perceivable signal, and
wherein the time interval is set as not less than a second voice latency from the far end to the client device.

18. The method according to claim 12, further comprising:
a receiving step of receiving data frames; and
a voice activity detecting step of detecting voice activity in the data frames received through the receiving step,
wherein the outputting step further comprises outputting a third perceivable signal indicating that there is incoming speech from a far end,
detecting voice activity from local audio input, and outputting a fourth perceivable signal indicating that there is a collision if both voice activities
are detected from the data frames and the local audio input at the same time.

* * * * *

UNITED STATES PATENT AND TRADEMARK OFFICE
CERTIFICATE OF CORRECTION

PATENT NO. : 9,525,845 B2
APPLICATION NO. : 14/426134
DATED : December 20, 2016
INVENTOR(S) : Dong Shi et al.

Page 1 of 1

It is certified that error appears in the above-identified patent and that said Letters Patent is hereby corrected as shown below:

On the Title Page

(73) Assignee: please delete "Dobly Laboratories Licensing Corporation, San Francisco, CA (US); Dobly International AB, Amsterdam Zuidoost (NL)" and insert therefor -- Dolby Laboratories Licensing Corporation, San Francisco, CA (US); Dolby International AB, Amsterdam Zuidoost (NL) --

Signed and Sealed this
Eleventh Day of December, 2018

Andrei Iancu
*Director of the United States Patent and Trademark Office*